United States Patent
Glasser et al.

(10) Patent No.: US 8,491,190 B2
(45) Date of Patent: Jul. 23, 2013

(54) METHOD OF CALIBRATING AN X-RAY DETECTOR

(75) Inventors: Francis Glasser, Eybens (FR); Michel Garcin, Saint Nizier du Moucherotte (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 305 days.

(21) Appl. No.: 13/002,545

(22) PCT Filed: Nov. 30, 2010

(86) PCT No.: PCT/EP2010/068528
§ 371 (c)(1),
(2), (4) Date: Jan. 4, 2011

(87) PCT Pub. No.: WO2011/067251
PCT Pub. Date: Jun. 9, 2011

(65) Prior Publication Data
US 2011/0233394 A1    Sep. 29, 2011

(30) Foreign Application Priority Data
Dec. 1, 2009  (FR) .................................. 09 05794

(51) Int. Cl.
*G01T 7/00* (2006.01)
(52) U.S. Cl.
USPC ........................................................ 378/207

(58) Field of Classification Search
USPC ................................................. 378/98.8, 207
See application file for complete search history.

(56) References Cited

U.S. PATENT DOCUMENTS

| 7,479,639 B1 | 1/2009 | Shahar et al. |
| 2011/0012014 A1* | 1/2011 | Livne et al. .................. 378/207 |

FOREIGN PATENT DOCUMENTS

| EP | 1840597 | 10/2007 |
| WO | 2008/065564 | 6/2008 |
| WO | 2009/122317 | 10/2009 |
| WO | 2009/155198 | 12/2009 |

* cited by examiner

*Primary Examiner* — Glen Kao
(74) *Attorney, Agent, or Firm* — Baker & Hostetler, LLP

(57) ABSTRACT

The general field of the invention includes methods of calibrating X-ray detection systems, the systems including at least one X-ray generator and a detection array having a matrix of detecting semiconductor pixels and processing and calibration electronics. The calibration method includes, for all or some of the pixels: operating the X-ray generator at its nominal high voltage, the generator being placed opposite the detector; counting, using the processing and calibration electronics, the pulses emitted by each pixel through the effect of the radiation produced by the generator; establishing, for each pixel, an amplitude distribution for the counted pulses; applying, to each amplitude distribution, a statistical indicator so as to identify a particular amplitude, this particular amplitude then corresponding to the energy corresponding to said statistical indicator; and adjusting, using the processing and calibration electronics, calibration parameters for each pixel, taking account of the energy-amplitude relationship thus established.

12 Claims, 3 Drawing Sheets

METHOD OF CALIBRATING AN X-RAY DETECTOR

CROSS-REFERENCE TO RELATED APPLICATIONS

This application is a National Stage of International patent application PCT/EP2010/068528, filed on Nov. 30, 2010, which claims priority to foreign French patent application No. FR 09 05794, filed on Dec. 1, 2009, the disclosures of which are incorporated by reference in their entirety.

FIELD OF THE INVENTION

The field of the invention is that of photon-counting, matrix X-ray detectors. More precisely, the invention relates to a method of calibrating the pixels of the matrix forming the detector.

BACKGROUND OF THE INVENTION

Monolithic semiconductor X-ray detectors comprise, as illustrated in FIG. 1, a planar substrate 1 made of a semiconductor. The detector material may be from the family of detectors that are semiconductors at room temperature. Mention will be made, notably, of CdTe, CdZnTe, GaAs, TlBr, $HgI_2$ or CdMnTe.

This substrate 1 comprises, on one of its sides, a matrix of first, positively biased electrodes 2 and, on the opposite side, a matrix of negatively biased electrodes 3. Each pixel thus consists of an elementary anode connected to its processing electronics. The typical pixel size, defined as the distance over which the electrodes repeat, may range from a few tens of microns to a few hundreds of microns.

When a photon X, the energy of which is located in the energy band from a few keV to a few hundred keV, crosses a semiconductor pixel it creates a number of electron-hole pairs 5 by ionizing atoms in the semiconductor crystal. These charges are captured by the electrodes of the pixel and generate, during their transit, electrical pulses at these electrodes. These pulses are counted by an ASIC 4—"ASIC" standing for application specific integrated circuit. The material 6 used to interconnect the substrate and the ASIC depends on the pixel size. Advantageously, indium or any metal having a low melting point, typically less than 150° C., is used for small sizes or conducting polymer adhesives are used for larger sizes.

For a radiation detection matrix using the counting principle, the pulse emitted by the elementary pixel is amplified, then compared to a threshold in order to decide whether the pulse is counted or not. The amplitude of this threshold defines the pulse amplitude and therefore theoretically the energy delivered to the detector by the incident photon. In the case of a multi-energy counting system, the various thresholds are adjusted so that they each correspond to a precise energy. Thus, energy bands and images corresponding to these bands are defined. These images are notably used in devices for imaging contrast agents or various tissues or for detecting explosives in the case of luggage inspection.

For a matrix of a few thousand pixels, the response sensitivity of the counting system as a function of the position of this threshold may vary quite significantly from one pixel to another, leading to response inhomogeneities. Various methods are commonly used to adjust these thresholds.

For example, to compensate for a temperature drift in the counting electronics, a calibrated charge is injected into all the pixels and the adjustment is carried out by sweeping their thresholds. The thresholds are then adjusted so that finally all the pixels only retain pulses having an amplitude which exceeds that of the injected signal. This injection may be carried out at the pixel level by a dedicated electronic device. It may also be carried out via the capacitor C of the semiconductor detector connected to each pixel. It may, for example, be a CdTe detector connected by an indium bump to a counting ASIC. The semiconductor detector then consists of a bias electrode on the top side and on the bottom side of many electrodes connected to the readout ASIC, pixel by pixel. By applying a rapid voltage variation δV to the common top electrode, an electrical pulse is created, the amplitude of which is C. δV/δt, in each small electrode connected to the input of the amplifier of the counting ASIC. One embodiment is presented in FIG. 2. The series of electronics located at the output of the pixel 10 comprises:

a capacitor 11 enabling an amount of charge to be injected into the amplifier channel so as to calibrate the system;

a first amplification stage 12 that amplifies the charge packet coming from the detector 10 by making, in the case of the figure, a current-voltage conversion;

electronic means 13 enabling the signals to be temporally shaped;

electronic means 14 for defining, with an analog/digital converter, a voltage threshold, used by the comparator;

electronic means 15 for comparing the input voltage with the threshold voltage and delivering a logic signal when this input voltage is greater than the threshold; and electronic means 16 for counting logic pulses in a given time interval and then transmitting the result to a readout bus.

The device operates as follows. A voltage of a few volts is applied upstream of the amplification stage 12 located at the output of the pixel 10 for a few nanoseconds to a few tens of nanoseconds, thus simulating the signal produced by an interaction of a photon of a certain energy in the detector. Next, the amplitude of the signal delivered by the various means making up the readout electronics of the pixel is determined, resulting in the amplitude corresponding to the pulse "injected" upstream of the pixel. By carrying out this operation for all the pixels of the detector, it is possible to know, for each pixel, the amplitude corresponding to this given pulse. This amplitude is then considered to be the threshold of each pixel. A detector, in which each pixel has been "thresholded", is then obtained, each threshold corresponding to the same pulse and therefore to the same energy deposited in the detector.

However, this calibration method has certain drawbacks since the correlation between the energy deposited in the detector and the duration and intensity of the pulse is difficult to establish. In addition, such a method does not take into account differences in charge transport and collection between each pixel. Indeed, two pixels may possess identical electronic capacities but completely different charge transport properties. In addition, the electronic circuits, and in particular the readout circuits, are subject to thermal drift. A threshold corresponding to a given energy may correspond, after a certain time, to a different energy. This relatively tedious operation must therefore be repeated over the course of time.

To carry out a more reliable calibration, it is necessary to use an X-ray or gamma-ray source of known characteristics. In order for the amplitude of the pulses produced by a detector to correspond to the corresponding energy of the incident photons, it is possible to calibrate the system with monoenergetic radiation sources of known energy. These sources are generally not very active and the statistics are insufficient even with long acquisition times. In the case of an X-ray tube, the energies emitted present an energy continuum between a minimum energy defined by the filtration of the generator, about 10 to 20 keV, depending on the application, and a maximum energy defined by the high voltage of the X-ray generator. It is possible to use the maximum energy as reference for the calibration. However, this is not easy when the thresholds must be adjusted to low-energy values, between 10 and 40 keV for example, since the number of photons emitted by the generator in this energy range is then very small. In addition, the generators used are not designed to emit at voltages located in the range from 10 to 40 kV. This is the case for example for X-ray scanners. Another method, described in the U.S. Pat. No. 7,479,639, consists in using radiation sources of well-known energy to calibrate the thresholds. However, this method is long and requires radiation sources to be present in the vicinity of the radiological system. The question of managing these sources in order to meet various safety standards then arises, all the more so in that the most active sources possible must be used if it is desired to achieve a correct calibration in a reasonable period of time.

International patent application WO 2009/122317 provides a calibration device using the radiation source of the detection system. However, this device requires a material of known spectral radiance in order to carry out the calibration. Attention is drawn, in particular, to FIG. 1 in the above application.

SUMMARY OF THE INVENTION

The method according to the invention does not have these drawbacks. The proposed calibration method uses the X-ray generator present in X-ray detection systems. Thus, both the drawbacks of a purely electronic calibration, which does not allow the entire detection channel to be calibrated, and the drawbacks of a calibration comprising standard sources or standard materials, necessarily more problematic to implement, are avoided at the same time. For each pixel, an amplitude threshold corresponding to the same energy is obtained by a simple and rapid method that takes into account the charge transport and collection in the detector material. Advantageously, the method makes use of means present at the point of use of the detector.

More precisely, the subject of the invention is a method of calibrating an X-ray detection system, said system comprising at least one X-ray generator and a detection array comprising a matrix of detecting semiconductor pixels and processing and calibration electronics, characterized in that the calibration method comprises, for all or some of the pixels, the various, following steps:
  operating the X-ray generator at its nominal high voltage, the generator being placed opposite the detector;
  counting, using the processing and calibration electronics, the pulses emitted by each pixel through the effect of the radiation produced by the generator;
  establishing, in each pixel, an amplitude distribution of the counted pulses;
  applying, to each amplitude distribution, a statistical indicator so as to identify a particular amplitude, this particular amplitude corresponding to an energy associated with said statistical indicator; and
  adjusting, using the processing and calibration electronics, calibration parameters for each pixel, taking account of the energy-amplitude relationship thus established.

Advantageously, the statistical indicator relating to said distribution comprises the median or any other percentile, or the mean. The final statistical indicator may also be a combination of various statistical indicators.

According to a first embodiment, in each pixel, the energy value corresponding to the amplitude of the signal corresponding to said indicator is treated as being an energy threshold.

According to a second embodiment, in each pixel, the pulses having an amplitude below a given threshold are not processed by the readout electronics of the pixel.

According to a third embodiment, such a method allows, for all the pixels, at least one energy window, lying between a first threshold and a second threshold, to be selected, the pulses corresponding to this window being separated from the other pulses.

Advantageously, this operation simultaneously considers, for each distribution, several different, predetermined statistical indicators, resulting in as many thresholds in each of the pixels considered, each threshold then corresponding to one of said statistical indicators.

Advantageously, this operation is carried out for all the pixels of a detector, but it may be performed on all or some of its pixels.

Advantageously, the lowest level threshold is located above the electrical noise of the processing electronics.

Advantageously, the calibration is systematically carried out between two measurements by the detection system

BRIEF DESCRIPTION OF THE DRAWINGS

The invention will be better understood and other advantages will be clear on reading the following nonlimiting description and on examining the appended drawings among which.

DETAILED DESCRIPTION

Figure 1:
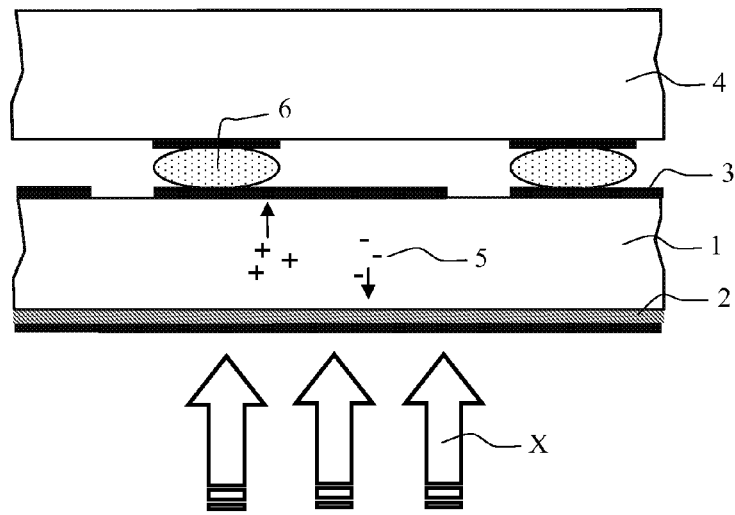
FIG. 1 shows the layout of a part of a detector having a matrix of semiconductor pixels.
Figure 2:
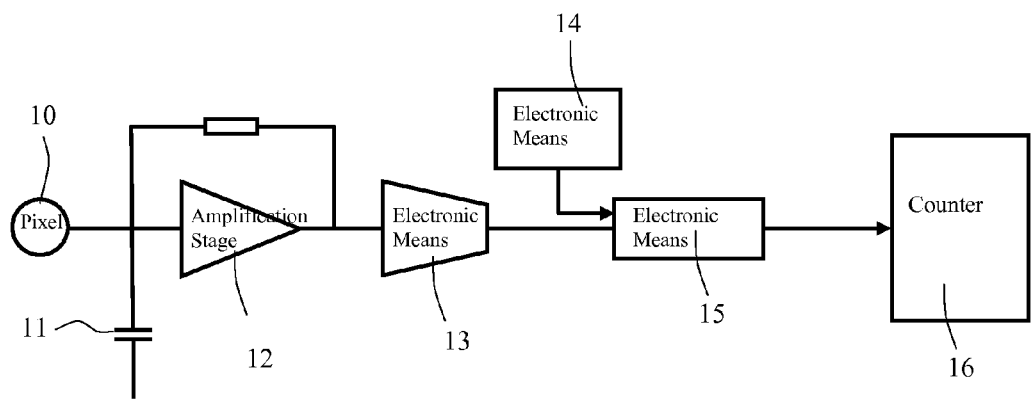
FIG. 2 shows a prior-art electronic calibration channel.
Figure 3:
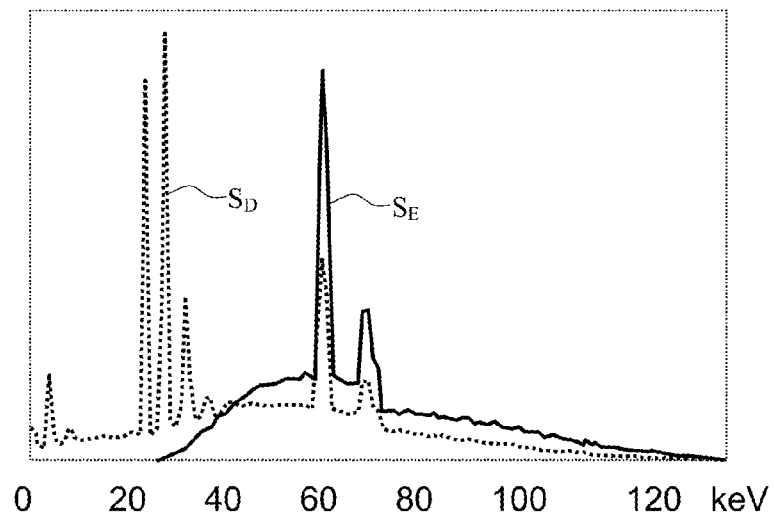
FIG. 3 shows the primary and secondary X-ray radiation in a detector having a matrix of semiconductor pixels.

The calibration method according to the invention uses the X-ray generator present in most X-ray detection systems. This generator is used at its nominal high voltage, i.e. between 15 and 160 kV. A particular feature of the response of semiconductor detectors, during the interaction of an incident photon with a detector pixel, is that part of the energy may be converted into lower-energy photons, which may then deposit their energy in a neighboring pixel. For a detector of a given volume, this effect is all the more apparent the more pixels there are, which is the case in detectors that have an electrode divided into small pixels. The expression "small pixel" is understood to mean a pixel the typical dimensions of which, defined by the distance over which the electrodes repeat, are between a few tens of microns and a few hundred microns. When the interaction takes place near the edge of the pixel, the cloud of charges created there may also be shared between several adjacent pixels. Thus numerous low-amplitude pulses are produced in each pixel over a very wide energy spectrum. FIG. 3 illustrates this effect. The solid curve shows the spectrum $S_E$ of the energy from the source, in this case a tungsten target, i.e. the incident radiation, the dotted curve shows the spectrum $S_D$ produced by a cadmium telluride (CdTe) semiconductor detector the anode of which is divided into small pixels, or elementary electrodes, such as those described above. The two spectra are shown as a function of the energy of the X-ray radiation in keV. As may be seen, this second spectra $S_D$ contains low-energy spectral lines corresponding to the energies imparted during various interactions in the detector and to the effect of charge carriers being shared between adjacent pixels.

By counting the pulses emitted by each pixel through the effect of the incident radiation and by classing them according to their amplitudes in the form of a histogram, an amplitude distribution of these pulses is obtained for each pixel the y-axis showing the amplitude and the x-axis showing the number of pulses counted.

The incident radiation, produced by an X-ray generator, may be considered to be homogenous from the point of view of its energy spectrum and from the point of view of its intensity. Thus, when the detector is illuminated by such radiation, each pixel is subjected to radiation having an identical energy spectrum. When the detector is considered to be of high quality it may be assumed that the amplitude distribution of the counted pulses is similar for all the pixels. Similarly, it is expected that the distribution will be of comparable shape and area. This is notably due to the fact that there is no great sensitivity difference between the pixels. The area under this distribution is also substantially the same for the all the pixels.

However, notably due to the electronic readout circuits differing from one pixel to another, this amplitude distribution may undergo, from one pixel to another, a translation along the amplitude axis. Thus, interactions that impart the same energy in the detector may generate pulses of different amplitudes depending on the location of the pixel collecting the charge carriers generated by this interaction. Without a particular correction, the correspondence between the amplitude of a pulse and the energy to which this pulse corresponds is not constant from one pixel to another. The expression "energy to which this pulse corresponds" is understood to mean the energy deposited by the interaction that generated this pulse.

It is necessary to correct this translation drift or effect, so that the correspondence between amplitude and energy is the same for all the pixels.

In the method according to the invention, such a correspondence is obtained by determining, for each distribution relating to each pixel, a criterion, for example a statistical indicator.

According to a preferred embodiment, this indicator is an Nth percentile, i.e. N % of the counted pulses are below this value, the 50th percentile corresponding to the median. Since the shape and the area of the distribution are preserved from one pixel to another, such a percentile then enables a direct relationship between the amplitude and the energy to be obtained. Thus, for each distribution, denoted $D_n$, corresponding to each pixel, denoted n, the Nth percentile, denoted $F_n^{N\%}$ corresponds to an amplitude $A_n^{N\%}$. Without a particular correction, the amplitudes $A_n^{N\%}$ are different from one pixel to another. However, since the pixels are subjected to homogenous radiation, and the detector is of good quality, it is considered that the same energy $E^N$ may be reasonably assigned to this percentile for all the pixels considered.

Thus, by determining, for each pixel n, the amplitude $A_n^{N\%}$ to which the Nth percentile, denoted $F_n^{N\%}$ n of the distribution Dn corresponds, a simple and direct correspondence between said amplitude and the energy $E^N$ corresponding to this percentile is obtained.

The calibration method according to the invention therefore comprises the following various steps:

Step 1: operating the X-ray generator at its nominal high voltage, the generator being placed so that the X-ray radiation seen by the detector is homogenous, and preferably perpendicular to the receiving surface of said detector. Advantageously an X-ray generator, notably the generator installed in the device of the radiology equipment to which the detector belongs, is used. This allows all or some of the pixels to be repeatedly calibrated, for example between to radiological examinations. The amplitude distribution measured in each pixel has a shape near or similar to that shown in FIG. 3.

Figure 5:
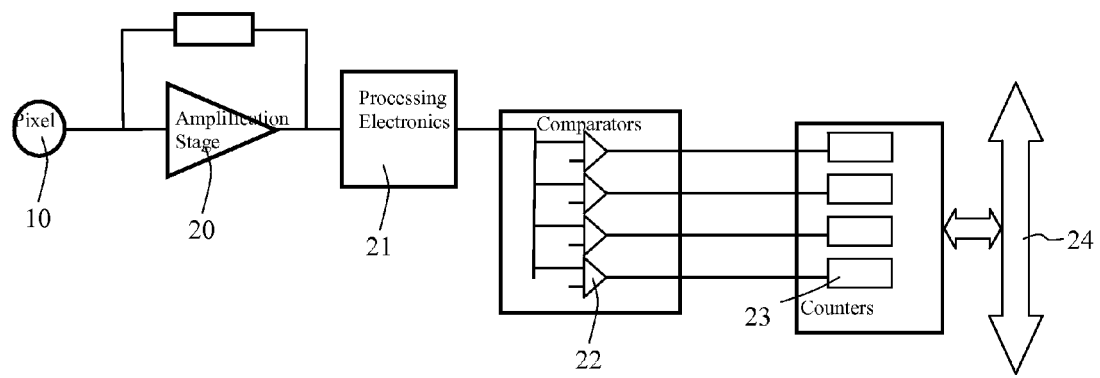
FIG. 5 shows the electronic layout of a counting channel in a detection system implementing the method according to the invention.

Step 2: counting, using the processing and calibration electronics, the pulses emitted by each pixel through the effect of the radiation produced by the generator. By way of example, FIG. 5 shows a counting channel. It comprises a detection pixel 10, amplification electronics 20, processing electronics 21 for shaping the signal, N comparators 22 that compare the energy of the pulses to N predetermined thresholds and N counters 23 each associated with one of the aforementioned comparators.

During the calibration phase, it is moreover possible to use only a single comparator, by varying the amplitude threshold beyond which the pulses are counted. It is thus possible to perform numerous counts $C_m$, the detector being irradiated in the same way, and to count only the pulses having an amplitude that exceeds a threshold $S_m$, this threshold being incremented between each count. Thus, if the threshold $S_m$ is increased between each count $C_m$, in other words if $S_m$ is higher than $S_{m-1}$ for two counts $C_m$ and $C_{m-1}$, the number of pulses having an amplitude between $S_m$ and $S_{m-1}$ is the number of pulses counted during the count $C_m$ minus the number of pulses counted during the count $C_{m-1}$, the duration of the counts being assumed here to be identical.

Alternatively, it is possible not to determine, during each measurement, counts, but count rates. An amplitude distribution is then established that represents, for various amplitudes, not an occurrence but a rate of occurrence, i.e. a number of occurrences per unit time, or count rate.

Otherwise, other methods known to those skilled in the art may be implemented to establish, for each pixel, a distribution of the amplitude of the pulses detected during exposure to an incident photon flux.

The data are then transmitted to a readout bus 24. The amplitude distribution of the signal measured by each pixel is analyzed: it may for example be a histogram of counted pulses classed according to their amplitude. As indicated above, it may for example be a histogram representing the count rate of each pulse, the pulses also being classed according to their amplitude. When the detector is of high quality, it may be assumed that, for each pixel, this distribution has a constant area, implying that the sensitivity of the pixels does not vary greatly. In addition, when the incident radiation is homogenous, this distribution has a constant shape from one pixel to another. However, due to electronic drift, this distribution may be shifted in amplitude, this shift varying from pixel to pixel, and also in time. The threshold is determined using a statistical indicator of this distribution. It may be an Nth percentile of this distribution, the threshold corresponding to an amplitude below which N % of the area of the distribution is found, i.e. N % of the pulses counted during this calibration phase. It is possible to use other statistical indicators, such as the mean for example, but Nth percentiles are the preferred indicators. Thus, by subjecting all the pixels to a given exposure that is homogenous both in energy and intensity, an indicator is determined for each pixel. This indicator may correspond, for the various pixels, to different amplitudes, but, for all the pixels considered, it corresponds to a given energy deposited in the detector. A correspondence between amplitude and energy is then established for each of the pixels.

According to a preferred embodiment of the invention, it is possible to "threshold" the pulses as function of this indicator, i.e. to retain, for example, only the pulses having an amplitude above this threshold. The various amplitude thresholds of the various pixels correspond to the same energy. It is then understood that, by carrying out such amplitude thresholding on each of the pixels, thresholding to the same energy level for all the pixels is achieved. By using various indicators, various amplitude thresholds result, each corresponding to various energy levels, these various energy levels being the same for all the pixels. By determining a number of thresholds, denoted Th(i), it is then possible to produce images corresponding to an energy band that contains pulses the amplitude of which is between two of these thresholds Th(i) and Th(i+1).

Figure 4:
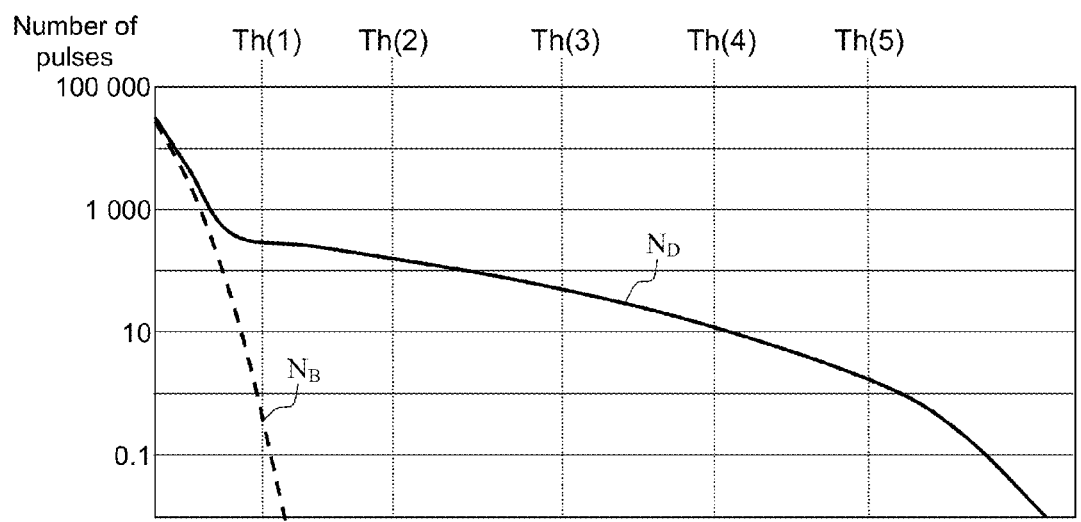
FIG. 4 shows the number of pulses detected as a function of the value of the threshold.

FIG. 4 thus shows, for a given pixel, the number of pulses $N_D$ received as a function of the energy E. In this figure, five thresholds Th(i) are defined. The first threshold Th(1) may be defined according to the noise acceptable for a given application. The counting noise $N_B$, represented by a dashed line in FIG. 4, depends on the electrical noise of the amplifier and on the proximity or nonproximity of the first threshold. It may be advantageous to subtract this noise so as not to falsify the measurement in the first energy band.

Step 3: adjusting, using the processing and calibration electronics, the threshold levels for each pixel so that each amplitude threshold corresponds to the same energy for all the pixels.

The number of pulses corresponding to a given threshold may be initially calibrated by various methods, the implementation of which may vary in complexity, notably using perfectly calibrated sources. However, the pixel-by-pixel adjustment according to the invention using the X-ray generator at its nominal voltage may be carried out regularly in order to take account of electronic drift and instability of the semiconductor material. Such rapid calibration may be performed before each patient is scanned in the case of a medical scanner or between two sets of luggage during inspection on a continuously operating detection line for detecting suspicious products. Thus, it is possible to perform calibrations a little before, or a little after, the use of the radiology device. The aforementioned drift effects are then limited.

Another particularly important advantage of the invention is that this calibration may be carried out using the same generator as that used during the medical examinations. No additional X-ray source is required.

Such a method allows the response stability of semiconductor detectors to be markedly improved, particularly for scanner imaging that requires very stable and very reproducible measurements.

The invention claimed is:

1. A method of calibrating an X-ray detection system, said X-ray detection system comprising at least one X-ray generator and a detection array comprising a matrix of detecting semiconductor pixels and processing and calibration electronics, wherein the calibration method comprises:
   operating the at least one X-ray generator at a nominal high voltage, the at least one X-ray generator being placed opposite the detection array;
   counting, using the processing and calibration electronics, pulses emitted by each pixel in the matrix of detecting semiconductor pixels through a radiation produced by the at least one X-ray generator;
   establishing, for each pixel, an amplitude distribution of the counted pulses and classing each pixel according to the pixel's amplitude;
   applying, to each amplitude distribution, a statistical indicator, said statistical indicator being chosen between at least a percentile and a mean of said amplitude distribution;
   identifying a particular amplitude corresponding to the applied statistical indicator to the amplitude distribution; and
   adjusting, using the processing and calibration electronics, calibration parameters for each pixel, taking account of an energy-amplitude relationship thus established.

2. The calibration method as claimed in claim 1, wherein the statistical indicator relating to said amplitude distribution being a percentile corresponding to a median of said amplitude distribution.

3. The calibration method as claimed in claim 1, wherein the statistical indicator is a combination of various percentiles.

4. The calibration method as claimed in claim 1, wherein, in each pixel, an energy value corresponding to the amplitude of said statistical indicator is treated as being an energy threshold by the processing and calibration electronics of the pixel.

5. The calibration method as claimed in claim 4, wherein a lowest level threshold is located above electrical noise of the processing electronics.

6. The calibration method as claimed in claim 5, wherein the pulses having an amplitude below said lowest level threshold are not processed by the processing and calibration electronics.

7. The calibration method as claimed in claim 4, wherein the processing and calibration electronics of the pixel determine at least one energy window, said window lying between a first threshold and a second threshold.

8. The calibration method as claimed in claim 7, wherein the processing and calibration electronics of the pixel divide each distribution into as many energy windows.

9. The calibration method as claimed in claim 8, wherein the operation of dividing each distribution received by each pixel into the as many energy windows is carried for the all the pixels in the matrix of detecting semiconductor pixels.

10. The calibration method as claimed in claim 8, wherein the operation of dividing each distribution received by each pixel into the as many energy windows is carried out for only certain pixels of the matrix of detecting semiconductor pixels.

11. The calibration method as claimed in claim 1, wherein the calibration method is systematically carried out between two measurements by the X-ray detection system.

12. A method of calibrating an X-ray detection system, said X-ray detection system comprising at least one X-ray generator and a detection array comprising a matrix of detecting semiconductor pixels and processing and calibration electronics, wherein the calibration method comprises:
   operating the at least one X-ray generator at a nominal high voltage, the at least one X-ray generator being placed opposite the detection array;
   counting, using the processing and calibration electronics, pulses emitted by each pixel in the matrix of detecting semiconductor pixels through a radiation produced by the at least one X-ray generator;
   establishing, for each pixel, an amplitude distribution of the counted pulses and classing each pixel according to the pixel's amplitude;

applying, to each amplitude distribution, a statistical indicator being chosen between at least a percentile and a mean of said amplitude distribution;

identifying a particular amplitude corresponding to the applied statistical indicator to the amplitude distribution; and adjusting, using the processing and calibration electronics, calibration parameters for each pixel, taking account of an energy-amplitude relationship thus established, wherein the X-ray detection system comprises a material of unknown spectral radiance.

\* \* \* \* \*